Feb. 17, 1953
D. G. C. HARE
2,629,082
SONIC TILTOMETER
Filed Feb. 19, 1945
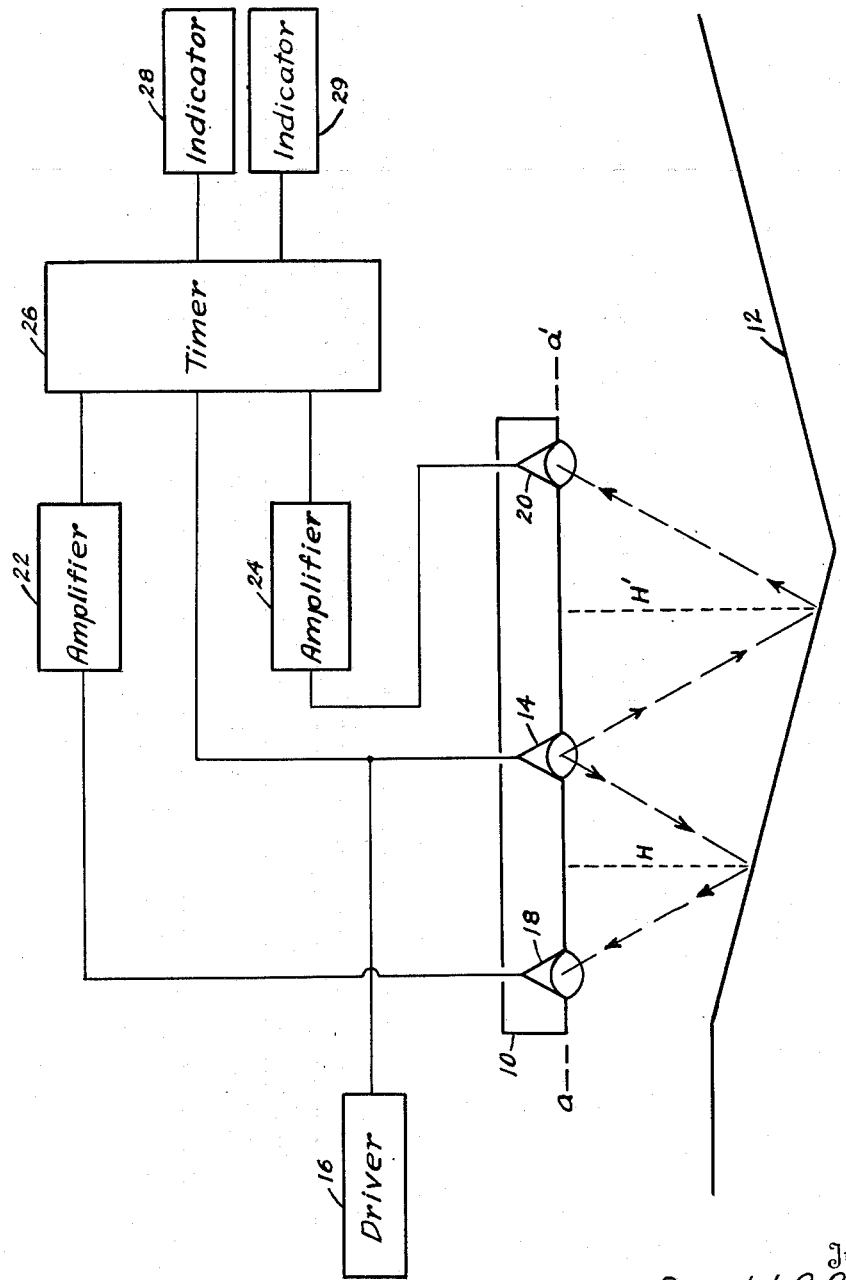
Inventor
Donald G. C. Hare
By
Attorney Patented Feb. 17, 1953

2,629,082

UNITED STATES PATENT OFFICE 2,629,082

SONIC TILTOMETER

Donald G. C. Hare, Long Island, N. Y., assignor to the United States of America as represented by the Secretary of the Navy Application February 19, 1945, Serial No. 578,772

5 Claims. (Cl. 340—1)

This invention relates to tiltometers, and more particularly to systems for determining the relative tilt of a chosen dimension of a movable object and a reference surface.

In addition to finding the separation between a movable object and a reference surface, it is often desirable to obtain information as to the relative orientation or tilt of some dimension of the movable object and the reference surface. For example, information as to relative tilt may be required to maintain the chosen dimension of the movable object substantially parallel to the reference surface as the object moves in respect thereto. This requirement may arise in connection with keeping a measuring instrument continuously substantially parallel to the surface of the earth.

Information as to relative tilt may also be used as a measure of the deviation of a reference surface from parallelism with a chosen reference plane. Thus, for example, irregularities in the earth's surface may be measured by maintaining a tiltometer of the type herein contemplated horizontal, and translating it in respect to the earth's surface. Under these conditions tilt indications are a measure of the deviations in the earth's surface from parallelism with the horizontal plane.

In many instances, information of the type considered above is required under circumstances such that the use of direct measurement, as by means of a tape or the like, is either impossible or impracticable. In the past, sonic altimeters or echo rangers utilizing sound of either audible or inaudible frequencies have been proposed for use in obtaining information as to the separation between two objects, as for example between a movable object and a reference surface. The continuous use of such sonic altimeters has been proposed as a method of determining the contours of the fixed surface as seen from the movable object. Such continuously operated systems, however, do not give information as to the relative tilt of the movable object and the reference surface, and consequently are not suitable for the purposes mentioned above.

Accordingly, there is proposed a tiltometer for measuring the relative tilt of a chosen dimension of a movable object and a reference surface, comprising a sonic projector mounted on the movable object, a driver for the projector, a pair of sonic receivers laterally disposed in respect to the projector on the object along the chosen dimension and arranged to receive sounds reflected from the reference surface, means for measuring the projector-receiver transit time for the sound reflected from the projector by the reference surface to each of the receivers, means for obtaining the difference between the transit times, and means calibrated in terms of relative tilt for indicating this difference.

For a better understanding of the invention, reference is made to the accompanying drawing which shows, in schematic form, a sonic tiltometer in accordance therewith.

In the drawing, a movable object is indicated schematically at 10 and a reference surface is shown at 12. It is assumed that it is desired to obtain information as to the relative tilt of the reference surface and one dimension of the movable object, this dimension being indicated by reference line $aa'$. A sonic projector 14 is mounted on the movable object and is actuated by driver 16. Conveniently, driver 16 may be an oscillator operating in the desired frequency range or a pulse generator having a pulse frequency in the same range. Sonic energy or sound is projected by projector 14 in the general direction of reference surface 12 and is reflected therefrom.

A pair of sonic receivers 18 and 20 are laterally disposed about projector 14 along dimension $aa'$ on movable object 10. Each of receivers 18 and 20 picks up sound from projector 14 reflected from reference surface 12. The transit times of the sound between the projector and the individual receivers are proportional respectively to the distances H and H', these transit times being equal if dimension $aa'$ is parallel to the portion of reference surface 12 immediately beneath the movable object and unequal under all other circumstances. Consequently, the difference in transit times is a measure of the relative tilt of the movable object and the reference surface, while the average of the two transit times is a measure of the separation between the object and the reference surface.

The outputs of sonic receivers 18 and 20 are applied respectively to amplifiers 22 and 24, the outputs of which are voltages proportional to the sonic energy picked up by the receivers. These voltages are applied to timer 26, together with a reference voltage derived from driver 16. The timer may be of any desired type capable of deriving two voltages, one proportional to the phase difference between the output voltage of amplifier 22 and the reference voltage from driver 16, and the other proportional to the phase difference between the output voltage of amplifier 24 and the same reference voltage. For this purpose a "Phaseometer" (High Frequency Measurements by August Hund, 1933) or the Phase Discriminator Rectifier at page 429 of Electronics by Bernard Lovell may be used. The basic nature of timer 26 is that of a phase detector such as presently found in both radar and television receivers.

The two output voltages from timer 26 are applied in opposition to an indicator 28 which indicates the difference between them. Conveniently, indicator 28 may be a zero-center voltmeter. If desired, an additional indicator 29 may be provided and the two outputs of timer 26 applied to and in such fashion that the average value thereof is indicated. Indicator 28 may be calibrated directly in degrees of relative tilt, while indicator 29 may be calibrated in terms of feet or other distance units.

I claim:

1. A system for measuring the relative tilt of a chosen dimension of a movable object and a reference surface, comprising a sonic projector mounted on said movable object, a driver for said projector, a pair of sonic receivers laterally disposed in respect to said projector on said object along said chosen dimension and arranged to receive sounds reflected from said reference surface, means for measuring the projector-receiver transit time for the sound reflected from the projector by the reference surface to each of said receivers, means for obtaining the difference between said transit times, and means calibrated in terms of relative tilt for indicating this difference.

2. A system for measuring the average distance between a chosen dimension of a movable object and a reference surface, comprising a sonic projector mounted on said movable object, a driver for said projector, a pair of sonic receivers laterally disposed in respect to said projector on said object along said chosen dimension and arranged to receive sounds reflected from said reference surface, means for measuring the projector-receiver transit time for the sound reflected by the reference surface to each of said receivers, means for obtaining the average of said transit times, and means calibrated in terms of separation for indicating this average.

3. A system for measuring the separation and relative tilt of a movable object and a reference surface, comprising a sonic projector mounted on said movable object, a driver for said projector, a pair of sonic receivers laterally disposed in respect to said projector on said object along said chosen dimension and arranged to receive sounds reflected from said reference surface, means for measuring the projector-receiver transit time for the sound reflected by the reference surface to each of said receivers, means for obtaining the difference between said transit times, means for obtaining the average of said transit times, means calibrated in terms of relative tilt for indicating the difference between transit times, and means calibrated in terms of separation for indicating the average of said transit times.

4. A system for measuring the relative tilt of a chosen dimension of a movable object and a reference surface, said system comprising: a sonic projector mounted on said movable object; a pair of sonic receivers laterally disposed with respect to said projector on said object along said chosen dimension; means for measuring the projector-receiver transit time for the sound reflected from the projector by the reference surface to each of said receivers; means for obtaining the difference between said transit times; and means for indicating said difference.

5. A system for measuring the relative tilt of a chosen dimension of a movable object and a reference surface, said system comprising: a sonic projector mounted on said movable object; a pair of sonic receivers laterally disposed with respect to said projector on said object along said chosen dimension; means for measuring the projector-receiver transit time for the sound reflected from the projector by the reference surface to each of said receivers; means for obtaining the difference between said transit times; means for obtaining the average of said transit times; means for indicating the difference between said transit times; and means for indicating the average of said transit times.

DONALD G. C. HARE.

REFERENCES CITED

The following references are of record in the file of this patent:

UNITED STATES PATENTS

| Number | Name | Date |
| --- | --- | --- |
| 1,636,502 | Fessenden | July 19, 1927 |
| 1,853,119 | Fessenden | Apr. 12, 1932 |
| 1,864,638 | Chilowsky | June 28, 1932 |
| 2,225,046 | Hunter | Dec. 17, 1940 |